US006754509B1

(12) United States Patent
Khan et al.

(10) Patent No.: US 6,754,509 B1
(45) Date of Patent: Jun. 22, 2004

(54) MOBILE COMMUNICATION DEVICE HAVING DUAL MICRO PROCESSOR ARCHITECTURE WITH SHARED DIGITAL SIGNAL PROCESSOR AND SHARED MEMORY

(75) Inventors: Safi Khan, San Diego, CA (US); Sanjay Jha, San Diego, CA (US); Albert Scott Ludwin, San Diego, CA (US); Mehraban Iraninejad, San Diego, CA (US); Raghu Sankuratri, San Diego, CA (US); Chauhung Lee, Poway, CA (US); Richard Higgins, San Diego, CA (US); Nicholas K. Yu, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/475,336

(22) Filed: Dec. 30, 1999

(51) Int. Cl.[7] .................................................. H04B 1/38
(52) U.S. Cl. .................................. 455/556.1; 455/550.1
(58) Field of Search ................................. 455/550, 556, 455/450, 466, 452, 556.2, 556.1; 710/244, 308; 380/49

(56) References Cited

U.S. PATENT DOCUMENTS

| | | | | |
|---|---|---|---|---|
| 5,381,360 A | * | 1/1995 | Shridhar et al. | 708/491 |
| 5,598,575 A | * | 1/1997 | Dent et al. | 710/28 |
| 5,668,880 A | * | 9/1997 | Alajajian | 370/342 |
| 5,841,431 A | * | 11/1998 | Simmers | 345/103 |
| 5,875,466 A | * | 2/1999 | Wakerly | 711/118 |
| 5,881,060 A | * | 3/1999 | Morrow et al. | 708/491 |
| 6,023,621 A | * | 2/2000 | Jackson et al. | 370/330 |
| 6,122,216 A | * | 9/2000 | Dykes | 365/230.03 |
| 6,131,040 A | * | 10/2000 | Knuutila et al. | 455/418 |
| 6,161,162 A | * | 12/2000 | DeRoo et al. | 710/244 |
| 6,167,408 A | * | 12/2000 | Cannon et al. | 340/825.56 |
| 6,275,891 B1 | * | 8/2001 | Dao et al. | 710/317 |
| 6,366,871 B1 | * | 4/2002 | Geva | 340/825.56 |
| 6,526,322 B1 | * | 2/2003 | Peng et al. | 700/5 |

* cited by examiner

Primary Examiner—Nay Maung
Assistant Examiner—Tu Nguyen
(74) Attorney, Agent, or Firm—Philip R. Wadsworth; Charles D. Brown; Kevin T. Cheatham

(57) ABSTRACT

The dual microprocessor system includes one microprocessor configured to perform wireless telephony functions and another configured to perform personal digital assistant (PDA) functions and other non-telephony functions. A memory system and a digital signal processor (DSP) are shared by the microprocessors. By providing a shared memory system, data required by both data microprocessors is conveniently available to both of the microprocessors and their peripheral components thereby eliminating the need to provide separate memory subsystems and further eliminating the need to transfer data back and forth between the separate memory subsystems. By providing a shared DSP, separate DSP devices need not be provided, yet both microprocessors can take advantage of the processing power of the DSP. In a specific example described herein, the microprocessors selectively program the DSP to perform, for example, vocoder functions, voice recognition functions, handwriting recognition functions, and the like.

20 Claims, 2 Drawing Sheets

MOBILE COMMUNICATION DEVICE HAVING DUAL MICRO PROCESSOR ARCHITECTURE WITH SHARED DIGITAL SIGNAL PROCESSOR AND SHARED MEMORY

BACKGROUND OF INVENTION

I. Field of the Invention

The invention generally relates to mobile communication devices such as smart phones and in particular to a dual-microprocessor architecture for use therein.

II. Description of the Related Art

A smart phone is a mobile communications device, such as a cellular telephone, configured to perform personal digital assistant (PDA) functions along with wireless telephony functions. Wireless telephony functions generally include the processing of wireless voice telephone calls, facsimile transmissions, data transmissions, paging messages, and the like. PDA functions generally include scheduling and calendaring functions, voice memo recording functions, phone book functions, alarm clock functions, hand-held game functions, voice recognition, handwriting recognition and the like. More sophisticated smart phones may also provide the ability for processing E-mail, browsing the Internet or download encoded video or music. Sophisticated smart phones may also provide the ability for determining location using a geosynchronous positioning system (GPS).

Various issues arise in designing an internal hardware architecture for a smart phone. The hardware must be capable of handling all of the necessary smart phone functions, while consuming relatively little power. The hardware component costs should be sufficiently inexpensive so that the overall costs of the smart phone remain competitive. Also, the hardware and software should be designed such that new products with new or enhanced functions can be quickly designed, tested and debugged and to be brought to market quickly.

For many years, dedicated microprocessors and peripheral components have been developed to perform wireless telephony functions. Other dedicated microprocessors and peripheral components have been developed to perform PDA functions. Since these systems have already been designed, tested and debugged, it is desirable at least initially to employ the existing microprocessors and peripheral components within the smart phone. Thus, rather than design, test and debug an entirely new microprocessor capable of handling both wireless telephony and PDA functions, it is preferable initially to design a system architecture which incorporates dual microprocessors. By incorporating dual microprocessors, the initial hardware and software design costs are kept low so that the cost of the smart phone remains competitive. Since the separate microprocessor systems have already been tested and debugged, only the resulting integrated system needs to be further tested and debugged and thus the smart phone can be brought to market fairly quickly.

However, at least some of the data processed by the smart phone must be accessible to both sets of microprocessors and peripheral components. For example, telephone numbers stored by the PDA system must be accessible to the wireless telephony system for use in initiating wireless telephone calls. For E-mail and Internet browser functions, data received by the wireless telephony system must be forwarded to the PDA subsystem for display by an E-mail software program, web browser, or the like. As another example, music or video downloaded from the Internet may need to be transferred from the wireless telephony system to the PDA system for proper playback. Depending upon the particular configuration of the overall system, numerous other types of data may need to be shared by both the wireless telephony system and the PDA system. Given that a significant amount of data must be shared, it is desirable to provide a shared memory system for use with the separate wireless telephony and PDA systems and it is to that end that aspects of the invention are directed.

To minimize power consumption, both microprocessors should be capable of being powered down, preferably independently of one another. Also, even while the microprocessors are in use, it may be preferable to operate the microprocessors using the different clock signals, having different clock frequencies. For example, the microprocessor of the PDA may be operated using a relatively slow clock signal whereas the wireless telephony microprocessor may need to be operated at a high clock frequency to properly process a real time wireless telephone call. Accordingly, it is desirable to configure the shared memory system so as to permit reliable access by either or both of the microprocessors to the shared memory system, regardless of the current clock rate of the microprocessors and regardless of whether one of the microprocessors is in a power shut-down mode. Still further problems arise in providing a shared memory system if both microprocessors, or if peripheral components associated therewith, require access to the shared memory simultaneously. Accordingly, it is desirable to provide a shared memory for use in a dual microprocessor system of a smart phone which resolves clocking issues and memory access contention issues and other aspects of the invention are directed to these ends.

Another issue that arises in designing a dual microprocessor system architecture for use within a smart phone is that some of the peripheral hardware components may be unnecessarily duplicated. For example, in connection with code division multiple access (CDMA) wireless telephony, a digital signal processor (DSP) is typically employed to perform vocoder functions. If the PDA is configured to respond to voice commands or is configured to recognize handwritten commands, the PDA may also require a DSP. Accordingly, it would be desirable to provide an improved dual microprocessor system architecture which eliminates the need to provide duplicative devices, such as DSP=s, and it is to that end that still other aspects of the invention are directed.

SUMMARY OF THE INVENTION

In accordance with a first aspect of the invention, a dual microprocessor system having a shared memory is provided for use in a mobile communications device. The system includes first and second microprocessors and a shared memory system accessible by both the microprocessors. By providing a shared memory system, data required by both microprocessors is conveniently shared thereby eliminating the need to provide duplicative memory subsystems and further eliminating the need to transfer data back and forth between duplicative memory subsystems. Hence, the overall size and power requirements of the dual microprocessor system are reduced and efficiency is increased. By retaining separate microprocessors, there is no need to design, test and debug an entirely new microprocessor capable of performing both wireless telephony functions and PDA functions.

In an exemplary embodiment, the mobile communication device is a smart phone. The first microprocessor is configured to perform wireless telephony functions. The second microprocessor is configured to perform PDA functions. The shared memory system includes a set of shared registers for storing commands, with each respective microprocessor communicating with the other microprocessor by storing commands within the shared registers for retrieval by the other microprocessor. By devoting a portion of the shared memory system to storing commands, the microprocessors are able to conveniently communicate with one another without requiring a bus system, or other communication system, directly interconnecting the two microprocessors. To minimize size and weight, and to also reduce power consumption and increase processing speed, the dual microprocessors, the shared memory and many of the peripheral components are formed within a single application specific integrated circuit (ASIC).

Also in the exemplary embodiment, the shared memory system includes first and second single-ported memory devices. The first microprocessor can read from both memory devices and write to the first device but cannot write to the second memory device. The second microprocessor can also read from both memory devices but writes only to the second device. A direct memory access (DMA) system is provided for interconnecting peripheral components of the first microprocessor with the shared memory system. A second DMA is provided for interconnecting the peripheral components of the second microprocessor with the shared memory. The first and second microprocessors are driven by first and second clock signals, of potentially differing clock rates. The shared memory system is driven by a clock signal set to the same clock rate as the higher clock rate of the microprocessors. The clock signal of the shared memory is within an independent clock regime from that of the clock signals of the first and second microprocessors such that shared memory can be accessed even if one or both of the first and second clock signals have been deactivated. An arbitration system is provided for arbitrating access to the shared memory system. The arbitration system grants priority to the microprocessor for controlling wireless telephony functions over the microprocessor for controlling PDA functions and grants priority to the DMA of the wireless telephony microprocessor over the DMA of the PDA microprocessor.

By configuring the system in accordance with the exemplary embodiment, memory contention issues are avoided, high-speed access to the memory is provided, and reliable operation of the shared memory is achieved despite independent clock rates and independent power shut down operations of either the first or second microprocessors.

In accordance with a second aspect of the invention, a dual microprocessor system having a shared DSP is provided for use in a mobile communications device. The system includes first and second microprocessors and a shared DSP accessible by both microprocessors. In an exemplary embodiment, the shared DSP includes shared program memory for storing firmware for controlling the functionality of the DSP. Each respective microprocessor determines whether the DSP is available and, if so, selectively stores firmware within the DSP for controlling the functions of the DSP. The firmware controls the DSP to perform vocoder functions, GPS location determination functions, voice recognition functions, handwriting recognition functions, and the like.

By providing a shared DSP, separate duplicative DSP devices need not be provided, yet both microprocessors can take advantage of the processing power of the DSP. Hence, size and power consumption is reduced and overall processing efficiency is increased.

The invention is also applicable to systems having two or more microprocessors. Additional objects, features and advantages of the invention are described below or will be apparent from the detailed description in combination with the accompanying drawings.

DETAILED DESCRIPTION OF THE EXEMPLARY EMBODIMENTS

With reference to the figures, preferred and exemplary embodiments of the invention will now be described. The embodiments will primarily be described with reference to a dual microprocessor system for use within a smart phone configured for use within a CDMA wireless communication system. However, principles of the invention are applicable to other multiple processor systems for use in other applications.

Figure 1:
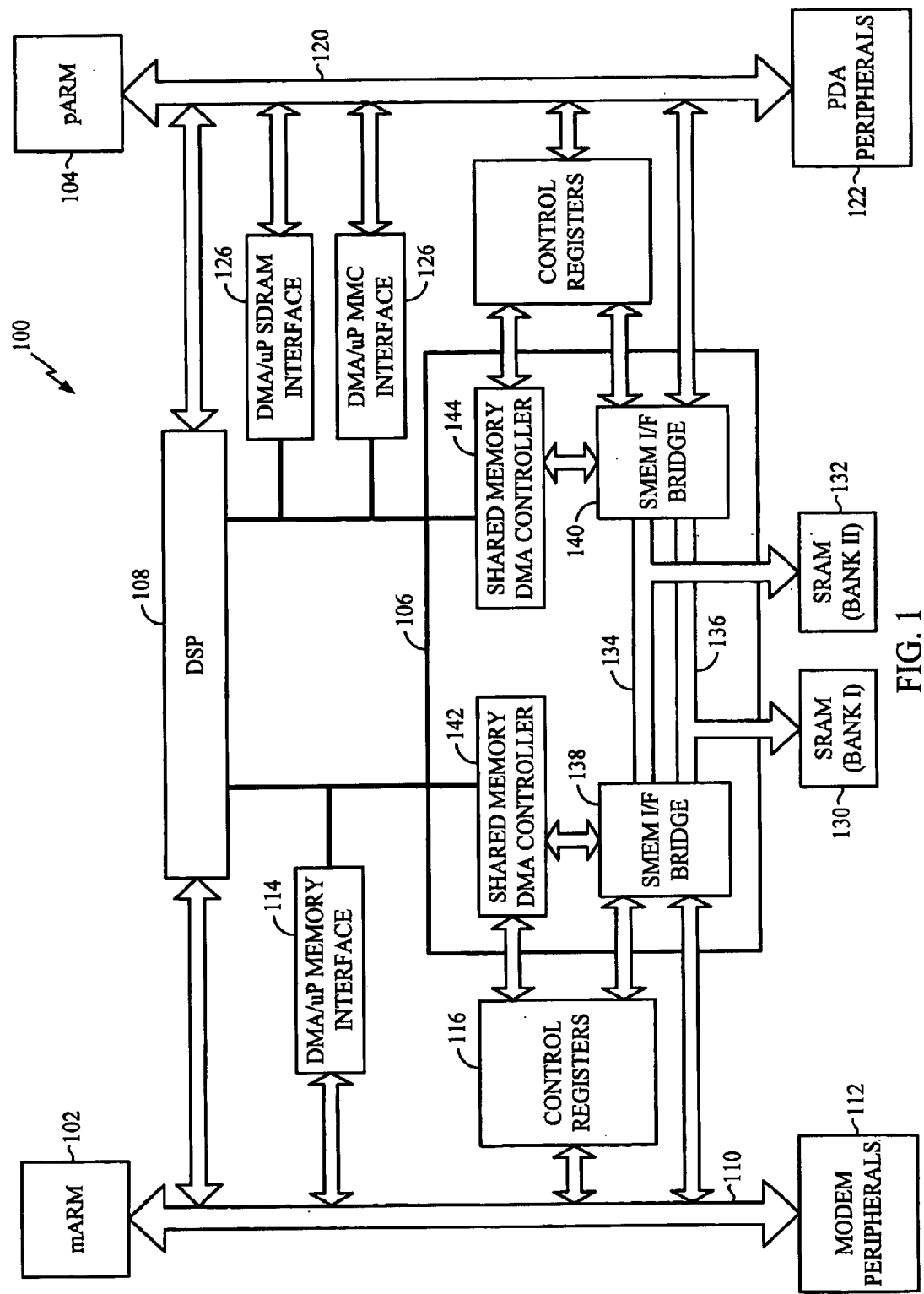
FIG. 1 is a block diagram illustrating a dual microprocessor system with shared memory and shared DSP configured in accordance with an exemplary embodiment of the invention.

FIG. 1 illustrates a dual microprocessor system 100 for use within a smart phone or other mobile wireless communications device. System 100 includes a voice and data modem microprocessor 102 configured for controlling wireless telephony functions and a PDA microprocessor 104 for controlling PDA and related functions. Wireless telephony functions controlled by microprocessor 102 include voice and data signal transmission and reception via CDMA. Voice signals transmitted via CDMA may be part of real-time voice telephone calls. Data signals transmitted via CDMA may be part of facsimiles, pages, e-mails, Internet downloads and the like. PDA functions controlled by microprocessor 104 include scheduling and calendaring functions, voice memo recording functions, phone number functions, alarm clock functions, and hand-held game functions and the like. Depending upon the implementation, the PDA microprocessor may further be configured to display (via a display device not specifically shown) e-mail messages, pages or facsimiles received by the modem microprocessor. The PDA may also be configured to provide an Internet web browser for display of web pages downloaded from the Internet by the modem microprocessor. Still other functions that may be performed by the PDA microprocessor include GPS functions for determining the current location of the smart phone, either via signals received using the modem microprocessor or signals received using dedicated GPS hardware components (not shown).

Modem microprocessor 102 and PDA microprocessor 104 access a shared memory system 106 and a shared DSP 108. The shared memory system permits the microprocessors to share data such as telephone numbers, e-mail messages, voice memos, and the like. The shared memory also permits the microprocessors to communicate with one another via command and control signals to permit each microprocessor to be advised of the status of the other microprocessor. The shared DSP permits the microprocessors to share the processing power of the DSP to permit elimination of duplicative, separate DSP=s. In this regard, the DSP is programmable via firmware received from the microprocessors to either perform various wireless telephony functions under the control of the modem microprocessor (such as vocoder functions or nearest base station determination functions) or to perform various PDA or other functions under the control of the PDA microprocessor (such as voice and handwriting recognition functions or GPS location determination functions).

Now considering the system architecture shown in FIG. 1 in greater detail, the modem microprocessor is one component of a modem subsystem also including a modem system bus 110, various modem peripheral components 112, a modem DMA system 114 and various modem control registers 116. Although not individually shown, modem peripheral components may include such devices as CDMA modulators and demodulators, encoders and decoders, interleavers and deinterleavers. These and other peripheral components for use in CDMA systems are well-known in the art and will not be described in further detail. Likewise, PDA microprocessor 104 is one component of a PDA subsystem also including a PDA system bus 120, various PDA peripheral components 122, PDA subsystem control registers 124 and a PDA subsystem DMA 126.

The components of the modem and PDA subsystems are driven by clock signals within different clock regimes. The clock signals are provided by clock controllers not separately shown in FIG. 1. Herein, the clock signals of the modem subsystem are referred to as being within the M_BCLK clock regime; whereas the clock systems of the PDA subsystems are referred to as being within the P_BCLK clock regime. Within each clock regime, numerous different clock signals may be employed, of differing clock frequencies. Indeed, within the preferred implementation, dozens of different clock signals of differing clock frequencies are employed to drive various components. In general, each component is driven using a clock signal having the lowest possible frequency that is sufficient to permit the component to perform its required functions. In this manner, maximum power savings are achieved. The shared memory and shared DMA are driven by clock signals within yet a third clock regime, herein referred to as the SMEM_BCLK clock regime. This permits the shared memory and the shared DSP to be operated even if one or both of the microprocessors are in a power shut-down mode. When at least one of the microprocessors is operational, the clock signals of the SMEM_BCLK regime are set to at least the same frequency as the operational microprocessor. If both microprocessors are operational, the clock signals of the SMEM_BCLK regime are set to a frequency at least as high as the higher clock frequency of the two microprocessors. In this manner, the shared memory and the shared DSP are always operated sufficiently fast to permit reliable access by either microprocessor. If neither microprocessor and neither DMA is in use, clock signals to the shared memory and shared DSP may be deactivated for further power savings.

As illustrated in FIG. 1, DSP 108 is directly connected to both the modem system bus and the PDA system bus for performing functions on behalf of either the modem or PDA microprocessors. In this regard, each microprocessor is configured to determine whether the DSP is currently available and, if so, to transfer firmware into the DSP for programming the functionality of the DSP. For example, during a wireless telephone call, the modem microprocessor may program the DSP to perform vocoder functions. While a wireless communication is not currently in progress, the PDA microprocessor may transfer firmware into the DSP to program the DSP to perform voice recognition functions, writing recognition functions, or GPS functions. Voice recognition is provided to permit a user to control the smart phone using voice commands, such as "CALL HOME" or "CALL THE OFFICE". Hand writing recognition permits the user to control the smart phone or to enter data by writing onto an input/output display pad (not separately shown) of the PDA.

Determination of whether the DSP is available is made by examining control registers 116 and 124. For example, if the modem microprocessor requires the use of the DSP, the modem microprocessor transfers appropriate signals into control registers 116 for routing through shared memory 106 to controlled registers 124. Thereafter, if the PDA modem seeks to also gain control to the DSP, the PDA modem first examines control registers 124 to determine whether the modem microprocessor is currently using the DSP and, if so, the PDA microprocessor defers attempting to control the DSP. If the DSP is available, the PDA microprocessor forwards appropriate control signals to control registers 124 for routing via the shared memory to controlled registers 116 such that the modem microprocessor can determine whether the PDA has taken control of the DSP. Since the functions to be performed by the modem microprocessor typically relate to real time wireless communications, such as real time and telephone calls and the like, the system is configured such that the modem microprocessor has priority over the PDA microprocessor for use of the DSP. The aforementioned DMA systems both interconnect the DSP with the shared memory such that the DSP can quickly and easily access data stored within the shared memory. In other implementations, no DMA is provided and, instead, the DSP gains access to the shared memory by transmitting appropriate interrupt signals to one or both of the microprocessors requesting access to data within a shared memory. The use of a DMA is preferred since it facilitates direct access to the shared memory to thereby improve processing speed.

With still further reference to FIG. 1, internal components of the shared memory will now be described. The shared memory includes first and second single-ported SRAM banks 130 and 132, respectively. The system is configured such that modem microprocessor 102 can only write to SRAM bank 130 but can read from either SRAM bank. PDA microprocessor 104 can only write to SRAM bank 132 but can read from either SRAM bank. Access to the two SRAM banks is facilitated by a pair of shared memory buses 134 to 136 each connected to respective bus bridges 138 and 140 which are, in turn connected to the modem and PDA system buses. The shared memory system also includes a pair of DMA controllers 142 and 144. DMA controller 142 controls modem DMA 114 whereas DMA controller 144 controls PDA DMA 126. With this configuration, each microprocessor can gain access to the SRAM banks of the shared memory either through the various system buses and bridges or via the respective DMA systems. The DSP can also gain access to the SRAM banks via either of the DMA systems.

Figure 2:
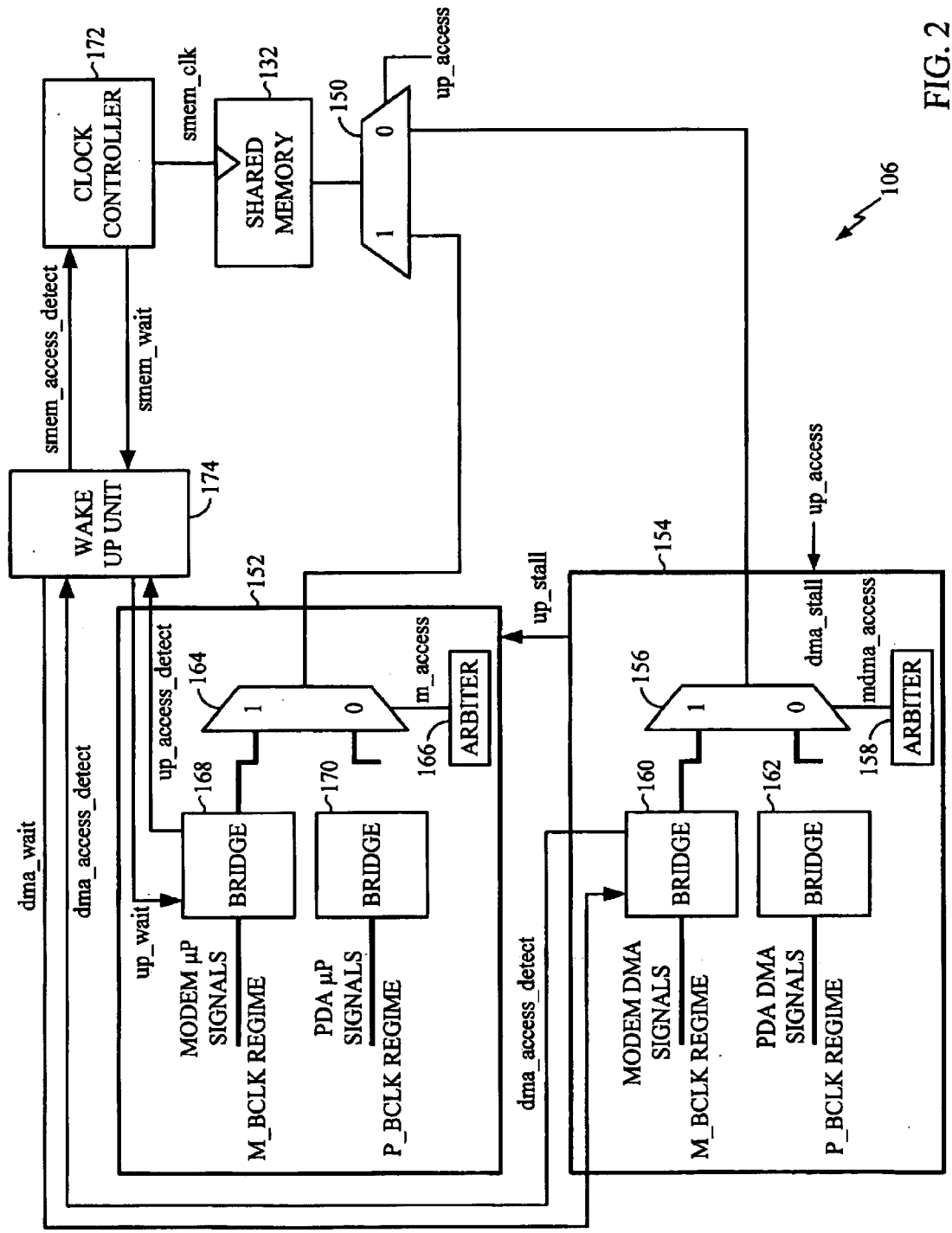
FIG. 2 is a block diagram illustrating a prioritization architecture for use with the shared memory system architecture of FIG. 1.

FIG. 2 is a block diagram illustrating components of shared memory system 106, particularly components directed to prioritizing access to the shared memory. A first multiplexer 150 selects between DMA accesses and microprocessor accesses. Microprocessor accesses are always given priority over DMA accesses. More specifically, whenever a _p_access signal is active, multiplexer 150 selects the output from a microprocessor access block 152; otherwise the multiplexer selects the output from a DMA access block 154. (The _p_access signal is also applied to a stall input of DMA access block 154 such that the block is stalled during all microprocessor accesses.) Within DMA block 154, a second multiplexer 156 selects between DMA signals received from the modem subsystem and DMA signals received from the PDA subsystem. An arbiter 158 controls multiplexer 154 using an mdma_access signal. Whenever mdma_access is active, multiplexer 156 selects the output from a bridge 160 which receives modem DMA signals; otherwise the multiplexer selects the output from a PDA DMA bridge 162. In the exemplary configuration, arbiter 158 always grants modem DMA signals priority over PDA DMA signals since modem operations often need to be performed in real time. However, arbiter 156 can be programmed to grant priority to PDA DMA accesses in certain circumstances such as for predetermined high priority PDA functions.

Within microprocessor access block 152, a third multiplexer 164 selects between modem microprocessor access signals and PDA microprocessor access signals. An arbiter 166 controls multiplexer 164 and grants priority to the modem microprocessor. As with the arbiter of the DMA, the arbiter for microprocessor accesses can be programmed, in other implementations, to selectively grant priority to the PDA. The arbiter controls multiplexer 164 using an m_access signal. Whenever m_access is active, multiplexer 164 selects the output from a bridge 168 which receives modem microprocessor signals; otherwise the multiplexer selects the output from a PDA microprocessor bridge 170. Note that, if the DMA access block has already initiated an access to the shared memory, _p_stall signal is applied to a stall input of microprocessor access block such that the block is stalled until completion of the DMA access.

The arbiters for the access blocks may be programmed to implement either a fixed priority scheme or a rotating priority scheme. Although the exemplary implementation of FIG. 2 illustrates separate arbiters for the two access blocks, a single arbiter may instead be provided.

As mentioned above, the PDA subsystem, modem subsystem and shared memory system are within different clock regimes. A clock controller 172 generates the clock signals within the shared memory clock regime (i.e. the SMEM_BCLK regime), and in particular generates a shared memory clock signal (smem_clk) for driving shared memory 106. The various bridges provided within the access blocks are configured to convert shared memory access signals to the clock regime of the shared memory. The clock signal for the shared memory may be deactivated for further power savings. Thus, circumstances may arise wherein one of the microprocessors or DMA systems may require access to shared memory but the shared memory is deactivated. To wake up the shared memory, each of the bridges within access blocks 152 and 154 generates access detection signals (such as dma_access_detect and _p_access_detect). The signals are forwarded to a wake-up unit 174. If the clock controller is not currently generating the shared memory clock, the wake-up unit sends wait signals (such as dma_wait and _p_wait) back to the access blocks causing the access blocks to defer access to the shared memory. Once the clock controller has activated the shared memory clock and the clock has become stable, the wait signal is deasserted permitting the memory access blocks 152 and 154 to forward their memory access signals to the shared memory via multiplexor 150. Within FIG. 4, exemplary interconnection signal line between the bridges and the wake-up unit are shown for the modem bridges. Additionally, though, similar connection lines also interconnect the PDA bridges to the wake-up unit permitting the PDA microprocessor or PDA DMA to wake up shared memory as well.

What has been described are various exemplary embodiments of a dual microprocessor system having a shared memory and a shared DSP for use within a mobile wireless communication device such as a CDMA-based smart phone. Principles of invention are applicable to other systems as well, including systems intended for other applications. In particular, principles of invention are applicable to systems incorporating three or more microprocessors sharing a common memory or a common DSP. Principles of invention are also applicable to other multiple microprocessor systems sharing other hardware devices besides a memory or a DSP. Accordingly, the exemplary embodiments described herein are merely illustrative of the invention and should not be construed as limiting the scope of the invention.

What is claimed is:

1. A system for use in a mobile communications device, said system comprising:

a plurality of microprocessors; and a shared memory system accessible by each of said plurality of microprocessors;

wherein the plurality of microprocessors includes a first microprocessor and a second microprocessor;

wherein said shared memory system includes a set of shared registers for storing commands, with each respective microprocessor communicating with the other microprocessor by storing commands within said shared registers for retrieval by the other microprocessor.

2. A system for use in a mobile communications device, said system comprising:

a plurality of microprocessors; and a shared memory system accessible by each of said plurality of microprocessors;

The system of claim 1 wherein the plurality of microprocessors includes a first microprocessor and a second microprocessor;

wherein said shared memory system includes a set of shared registers for storing commands, with each respective microprocessor communicating with the other microprocessor by storing commands within said shared registers for retrieval by the other microprocessor;

further including an interrupt system, with each respective microprocessor forwarding an interrupt to the other microprocessor after a command has been stored within said shared registers to notify the other microprocessor that a command is available for retrieval.

3. A system for use in a mobile communications device, said system comprising:

a plurality of microprocessors; and a shared memory system accessible by each of said plurality of microprocessors;

wherein the plurality of microprocessors includes a first microprocessor and a second microprocessor;

further including a shared digital signal processor accessible by both said first and second microprocessors;

wherein said shared digital signal processor includes shared program memory for storing firmware for controlling the functionality of the digital signal processing, with each respective microprocessor determining whether the digital signal processor is available and, if so, selectively storing firmware within the digital signal processor.

4. A system for use in a mobile communications device, said system comprising:

a plurality of microprocessors; and a shared memory system accessible by each of said plurality of microprocessors, wherein the plurality of microprocessors includes a first microprocessor and a second microprocessor;

further including a shared digital signal processor accessible by both said first and second microprocessors;

wherein said shared digital signal processor includes shared program memory for storing firmware for controlling the functionality of the digital signal processing, with each respective microprocessor determining whether the digital signal processor is available and, if so, selectively storing firmware within the digital signal processor;

wherein said firmware controls the digital signal processor to perform functions wherein the functions are vocoder functions, GPS functions, voice recognition functions, or handwriting recognition functions.

5. A system for use in a mobile communications device, said system comprising:

a plurality of microprocessors; and a shared memory system accessible by each of said plurality of microprocessors, wherein the plurality of microprocessors includes a first microprocessor and a second microprocessor;

further including a shared digital signal processor accessible by both said first and second microprocessors;

wherein said shared digital signal processor includes shared program memory for storing firmware for controlling the functionality of the digital signal processing, with each respective microprocessor determining whether the digital signal processor is available and, if so, selectively storing firmware within the digital signal processor;

for wherein the mobile communication device is a cellular telephone and wherein said firmware controls the digital signal processor to perform filtering functions to detect a nearest base station to the cellular telephone.

6. A system for use in a mobile communications device, said system comprising:

a plurality of microprocessors; and a shared memory system accessible by each of said plurality of microprocessors;

wherein the plurality of microprocessors includes a first microprocessor and a second microprocessor;

wherein the first and second microprocessors are driven by first and second clock signals, of potentially differing clock rates, and wherein said a shared memory system is driven by a clock signal set to the same rate as the higher clock rate of the first and second clock signals.

7. A system for use in a mobile communications device, said system comprising:

a plurality of microprocessors; and a shared memory system accessible by each of said plurality of microprocessors;

wherein the plurality of microprocessors includes a first microprocessor and a second microprocessor;

wherein the first and second microprocessors are driven by first and second clock signals, of potentially differing clock rates, and wherein said a shared memory system is driven by a clock signal set to the same rate as the higher clock rate of the first and second clock signals;

wherein said clock signal of said shared memory is within an independent clock regime from that of said clock signals of said first and second microprocessors such that said shared memory operates even if one or both of the first and second clock signals are deactivated.

8. A system for use in a mobile communications device, said system comprising:

a plurality of microprocessors; and a shared memory system accessible by each of said plurality of microprocessors;

wherein the plurality of microprocessors includes a first microprocessor and a second microprocessor;

further including a first non-shared memory system connected to the first, microprocessor and a first direct memory access unit interconnecting the first non-shared memory system and the shared memory system.

9. A system for use in a mobile communications device, said system comprising:

a plurality of microprocessors; and a shared memory system accessible by each of said plurality of microprocessors;

wherein the plurality of microprocessors includes a first microprocessor and a second microprocessor;

further including a first non-shared memory system connected to the first microprocessor and a first direct memory access unit interconnecting the first non-shared memory system and the shared memory system;

further including a shared digital signal processor accessible by both said first and second microprocessors, said direct memory access system additionally interconnected to the shared digital signal processor.

10. A system for use in a mobile communications device, said system comprising:

a plurality of microprocessors; and a shared memory system accessible by each of said plurality of microprocessors;

wherein the plurality of microprocessors includes a first microprocessor and a second microprocessor;

further including a first non-shared memory system connected to the first microprocessor and a first direct memory access unit interconnecting the first non-shared memory system and the shared memory system;

further including a second non-shared memory system connected to the second microprocessor and a second direct memory access unit interconnecting the second non-shared memory system and the shared memory system.

11. A system for use in a mobile communications device, system comprising:

a plurality of microprocessors; and a shared digital signal processor accessible by each of said plurality of microprocessors;

wherein the plurality of the microprocessors includes first and second microprocessors;

wherein said shared digital signal processor includes shared program memory for storing firmware for controlling the functionality of the digital signal processing, with each respective microprocessor determining whether the digital signal processor is available and, if so, selectively storing firmware within the digital signal processor.

12. A system for use in a mobile communications device, said system comprising:

a plurality of microprocessors; and a shared digital signal processor accessible by each of said plurality of microprocessors;

wherein the plurality of the microprocessors includes first and second microprocessors;

wherein said shared digital signal processor includes shared program memory for storing firmware for controlling the functionality of the digital signal processing, with each respective microprocessor determining whether the digital signal processor is available and, if so, selectively storing firmware within the digital signal processor;

wherein said firmware controls the digital signal processor to perform functions wherein the functions are vocoder functions, GPS functions, voice recognition functions, or handwriting recognition functions.

13. A system for use in a mobile communications device, said system comprising:

a plurality of microprocessors; and a shared digital signal processor accessible by each of said plurality of microprocessors;

wherein the plurality of the microprocessors includes first and second microprocessors;

wherein said shared digital signal processor includes shared program memory for storing firmware for controlling the functionality of the digital signal processing, with each respective microprocessor determining whether the digital signal processor is available and, if so, selectively storing firmware within the digital signal processor:

for wherein the mobile communication device is a cellular telephone and wherein said firmware controls the digital signal processor to perform filtering functions to detect a nearest base station to the cellular telephone.

14. A system for use in a mobile communications device, the system comprising:

a plurality of microprocessors including a first microprocessor and a second microprocessor, wherein the first microprocessor is configured for controlling cellular telephony functions and the second microprocessor is configured for controlling personal data assistant functions; and a shared memory system accessible by each of the plurality of microprocessors, wherein the shared memory system includes a set of shared registers for storing commands, with each respective microprocessor communicating with the other microprocessor by storing commands within the shared registers for retrieval by the other microprocessor.

15. The system of claim 14 further including an interrupt system, with each respective microprocessor forwarding an interrupt to the other microprocessor after a command has been stored within the shared registers to notify the other microprocessor that a command is available for retrieval.

16. A system for use in a mobile communications device, the system comprising:

a plurality of microprocessors including a first microprocessor and a second microprocessor, wherein the first microprocessor is configured for controlling cellular telephony functions and the second microprocessor is configured for controlling personal data assistant functions; and a shared memory system accessible by each of the plurality of microprocessors, wherein the shared memory system includes a set of shared registers for storing commands, with each respective microprocessor communicating with the other microprocessor by storing commands within the shared registers for retrieval by the other microprocessor;

wherein the first and second microprocessors are driven by first and second clock signals, of potentially differing clock rates, and wherein the shared memory system is driven by a clock signal set to the same rate as the higher clock rate of the first and second clock signals.

17. A system for use in a mobile communications device, the system comprising:

a plurality of microprocessors including a first microprocessor and a second microprocessor, wherein the first microprocessor is configured for controlling cellular telephony functions and the second microprocessor is configured for controlling personal data assistant functions; and a shared memory system accessible by each of the plurality of microprocessors, wherein the shared memory system includes a set of shared registers for storing commands, with each respective microprocessor communicating with the other microprocessor by storing commands within the shared registers for retrieval by the other microprocessor;

wherein the first and second microprocessors are driven by first and second clock signals, of potentially differing clock rates, and wherein the shared memory system is driven by a clock signal set to the same rate as the higher clock rate of the first and second clock signals;

wherein the clock signal of the shared memory is within an independent clock regime from that of the clock signals of the first and second microprocessors such that the shared memory operates even if one or both of the first and second clock signals are deactivated.

18. A system for use in a mobile communications device, the system comprising:

a plurality of microprocessors including a first microprocessor and a second microprocessor, wherein the first microprocessor is configured for controlling cellular telephony functions and the second microprocessor is configured for controlling personal data assistant functions; and a shared digital signal processor accessible by each of the plurality of microprocessors, wherein the shared digital signal processor includes shared program memory for storing firmware for controlling the functionality of the digital signal processing, with each respective microprocessor determining whether the digital signal processor is available and, if so, selectively storing firmware within the digital signal processor.

19. The system of claim 18, wherein the firmware controls the digital signal processor to perform functions wherein the functions are vocoder functions, GPS functions, voice recognition functions, or handwriting recognition functions.

20. The system of claim 18 wherein the mobile communications device is a cellular telephone and wherein the firmware controls the digital signal processor to perform filtering functions to detect a nearest base station to the cellular telephone.

* * * * *